(12) United States Patent
Geiss et al.

(10) Patent No.: US 10,639,996 B2
(45) Date of Patent: May 5, 2020

(54) SAFETY DEVICE FOR REVERSIBLE DISCONNECTION OF AT LEAST ONE ELECTRICAL COMPONENT OF A MOTOR VEHICLE, MOTOR VEHICLE WITH A SAFETY DEVICE, AND METHOD FOR OPERATING A SAFETY DEVICE

(71) Applicant: AUDI AG, Ingolstadt (DE)

(72) Inventors: Markus Geiss, Wemding (DE); Steffen Fey, Hepberg (DE)

(73) Assignee: AUDI AG, Ingolstadt (DE)

( * ) Notice: Subject to any disclaimer, the term of this patent is extended or adjusted under 35 U.S.C. 154(b) by 77 days.

(21) Appl. No.: 15/926,078

(22) Filed: Mar. 20, 2018

(65) Prior Publication Data

US 2018/0290543 A1 Oct. 11, 2018

(30) Foreign Application Priority Data

Apr. 6, 2017 (DE) .................. 10 2017 205 861

(51) Int. Cl.
*B60L 3/00* (2019.01)
*B60L 3/04* (2006.01)
(Continued)

(52) U.S. Cl.
CPC ........... *B60L 3/0007* (2013.01); *B60L 3/0046* (2013.01); *B60L 3/0092* (2013.01); *B60L 3/04* (2013.01);
(Continued)

(58) Field of Classification Search
CPC .. Y02T 10/7044; Y02T 10/7005; B60L 58/13; B60L 3/0007; B60L 2240/427;
(Continued)

(56) References Cited

U.S. PATENT DOCUMENTS 8,547,060 B2 10/2013 An et al.
2008/0197810 A1 8/2008 Ishikawa et al.
(Continued)

FOREIGN PATENT DOCUMENTS

DE 60106993 T2 3/2006
DE 602004003947 T2 10/2007
(Continued)

OTHER PUBLICATIONS

English translation of WO-2013014768-A1, Jan. 2013, Shimana Tomoko (Year: 2013).*

(Continued)

*Primary Examiner* — Jared Fureman
*Assistant Examiner* — Duc M Pham
(74) *Attorney, Agent, or Firm* — Maier & Maier, PLLC

(57) ABSTRACT

A safety device for the reversible disconnection of at least one electrical component of a motor vehicle, with a first switching device. An electrical connection of a first energy supply unit of the motor vehicle to the at least one electrical component, in particular to an electric drive of the motor vehicle, is present in a first switching state of the first switching device and is interrupted in a second switching state of the first switching device. The safety device has a second switching device. An electrical connection of a second energy supply unit of the motor vehicle, which is connected in parallel to the first energy supply unit and is designed as a capacitor, to the at least one electrical component is present in a first switching state of the second switching device and is interrupted in a second switching state of the second switching device.

7 Claims, 1 Drawing Sheet

(51) Int. Cl.
  *H02J 7/00* (2006.01)
  *H02J 7/34* (2006.01)
  *B60L 3/12* (2006.01)
  *B60L 50/50* (2019.01)
  *B60L 50/40* (2019.01)
  *B60L 58/13* (2019.01)
  *H02J 7/14* (2006.01)
  *H02M 1/32* (2007.01)

(52) U.S. Cl.
  CPC ............... *B60L 3/12* (2013.01); *B60L 50/40* (2019.02); *B60L 50/50* (2019.02); *B60L 58/13* (2019.02); *H02J 7/0031* (2013.01); *H02J 7/1461* (2013.01); *H02J 7/345* (2013.01); *B60L 2240/427* (2013.01); *B60L 2240/429* (2013.01); *B60L 2240/527* (2013.01); *B60L 2240/529* (2013.01); *B60L 2240/547* (2013.01); *B60L 2260/26* (2013.01); *H02M 2001/322* (2013.01); *Y02T 10/642* (2013.01); *Y02T 10/7005* (2013.01); *Y02T 10/705* (2013.01); *Y02T 10/7022* (2013.01); *Y02T 10/7044* (2013.01)

(58) Field of Classification Search
  CPC .... B60L 2260/26; B60L 50/50; H02J 7/0031; H02M 2001/322
  See application file for complete search history.

(56) References Cited

U.S. PATENT DOCUMENTS

2010/0296204 A1  11/2010  Ichikawa et al.
2012/0235473 A1*  9/2012  Jiang .................. H01M 2/1072
                                                        307/9.1
2013/0234510 A1   9/2013  Nakamura
2015/0311799 A1* 10/2015  Okaniwa .................. B60L 1/00
                                                        323/271
2016/0362004 A1* 12/2016  Einhorn ................ B60L 3/0069

FOREIGN PATENT DOCUMENTS

| | | |
|---|---|---|
| DE | 102008063652 A1 | 6/2010 |
| DE | 102010026772 A1 | 1/2012 |
| DE | 10 2010 050 347 B3 | 5/2012 |
| DE | 10 2012 020 019 A1 | 4/2014 |
| DE | 10 2014 114 682 A1 | 4/2015 |
| DE | 10 2014 220 671 A1 | 6/2015 |
| DE | 10 2015 207 222 A1 | 10/2016 |
| EP | 2 860 060 A2 | 4/2015 |
| EP | 2944502 A1 | 11/2015 |
| WO | 2013/014768 A1 | 1/2013 |

OTHER PUBLICATIONS

German Search Report dated Dec. 22, 2017 of corresponding German application No. 102017205861.7; 10 pgs.

European Search Report dated Sep. 12, 2018, in connection with corresponding EP Application No. 18158590.2 (12 pgs.).

Examination Report dated Feb. 18, 2020, in corresponding European patent application No. 18158590.2 including partial machine-generated English language translation; 12 pages.

* cited by examiner

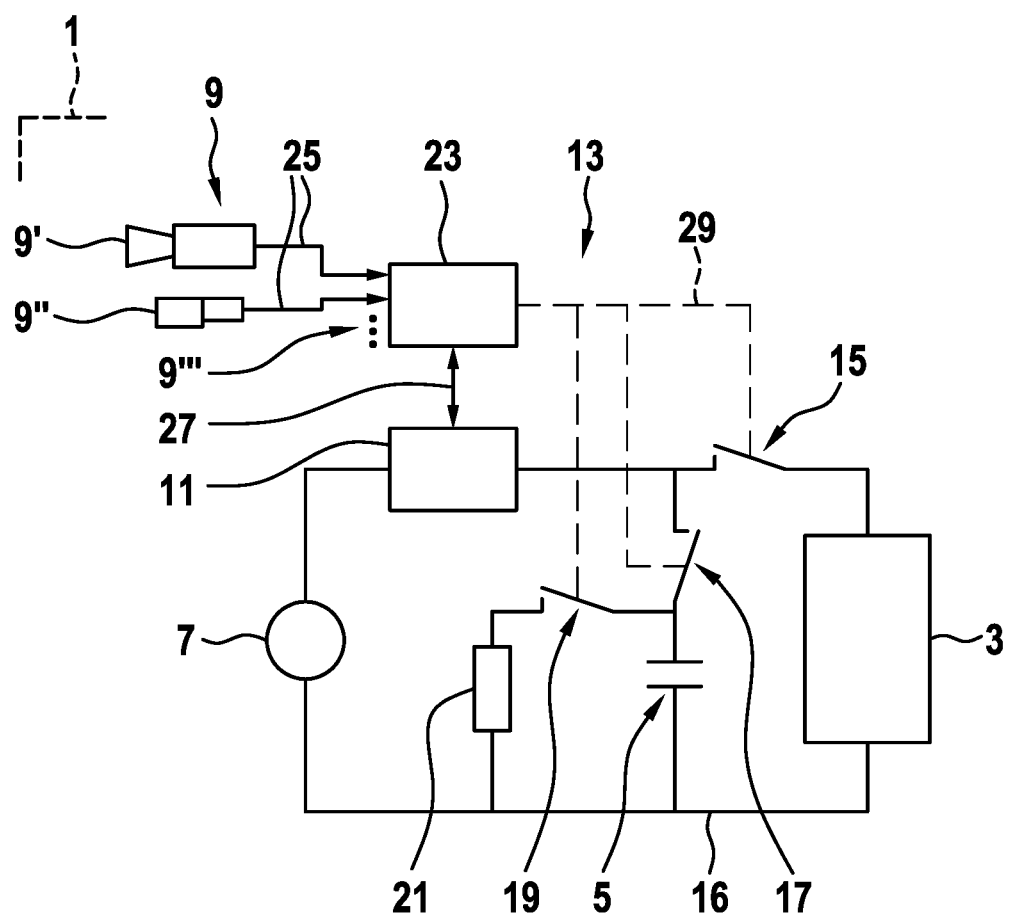

SAFETY DEVICE FOR REVERSIBLE DISCONNECTION OF AT LEAST ONE ELECTRICAL COMPONENT OF A MOTOR VEHICLE, MOTOR VEHICLE WITH A SAFETY DEVICE, AND METHOD FOR OPERATING A SAFETY DEVICE

FIELD

The invention relates to a safety device for reversible disconnection of at least one electrical component of a motor vehicle. The invention further relates to a motor vehicle with a safety device. The invention further relates to a method for operating a safety device.

BACKGROUND

For motor vehicles with an electric drive, in particular for electric motor vehicles or hybrid electric motor vehicles, an electrical connection of electrical components of the motor vehicle, preferably of high-voltage components, to an energy supply unit, which is designed, in particular, as a rechargeable battery, preferably a high-voltage battery, is disconnected during an accident in order to prevent a short circuit due to damage to the motor vehicle caused by the accident, in particular a destruction or deformation thereof. A motor vehicle is understood, in particular, to be a passenger motor vehicle or a commercial vehicle. The electrical components of the kind addressed are, in particular, a drive of the motor vehicle and preferably other devices, in particular a power electronics unit of the motor vehicle. Preferably, an onboard power supply system of the motor vehicle, in particular a high-voltage onboard power supply system, via which the electrical components are supplied with energy, is thereby disconnected from the energy supply unit.

Typically, such a disconnection occurs by means of a switching device, which, for example, is designed as a contactor. It is also possible that the switching device is designed as pyrotechnic element, in particular within the energy supply unit. The switching device is actuated, as a rule, by way of an airbag control instrument. In an accident, the electrical components are typically under load when they are disconnected from the energy supply unit. In particular, for a design of the switching device as a contactor, this disconnection leads typically to arcing between contacts of the switching device, which causes a high wear. Furthermore, after the disconnection of the electrical connection, the motor vehicle either has to be restarted or has to be brought to a repair shop for renewed startup.

Because of such a limitation in an operation of the motor vehicle, typically a safety device, which brings about or initiates a disconnection of the electrical components, as a rule, has a very robust design, so in that a disconnection of the electrical components from the energy supply unit and consequently a deactivation of the onboard power supply system—in particular in regard to damage to the motor vehicle due to an accident—occurs relatively late in time. An accident detection in conjunction with such a safety device is made in this case typically by means of a sensor device, which, in particular, is provided for triggering restraint systems. On account of the addressed relatively late disconnection of the electrical components from the energy supply unit, these components are protected by means of complicated armoring against detrimental effects due to an accident, in particular when they can be damaged with a high probability during an accident, in order to prevent, in particular, the danger of a short circuit due to its effects.

SUMMARY

The invention is based on the object of creating a safety device for the reversible disconnection of at least one electrical component of a motor vehicle, a motor vehicle with a safety device, and a method for operating a safety device, which, in comparison to known safety devices, motor vehicles, and methods, have advantages and, in particular, are more resistant to wear, adversely affect an operation of the motor vehicle to a lesser extent during an accident or an imminent accident, and offer a high degree of safety.

The object is achieved, in particular, by creating a safety device for the reversible disconnection of at least one electrical component of a motor vehicle, which has a first switching device. In this case, an electrical connection of a first energy supply unit of the motor vehicle to the at least one electrical component, in particular to an electric drive of the motor vehicle, is present in a first switching state of the first switching device and is interrupted in a second switching state of the first switching device. It is provided in this way that the safety device has a second switching device, wherein an electrical connection of a second energy supply unit of the motor vehicle, which is connected in parallel to the first energy supply unit and is designed as a capacitor, to the at least one electrical component is present in a first switching state of the second switching device and is interrupted in a second switching state of the second switching device.

The safety device has numerous advantages in comparison to the prior art. Owing to the fact that the safety device has the second switching device, wherein the electrical connection of the second energy supply unit of the motor vehicle, which is connected in parallel to the first energy supply unit and is designed as a capacitor, to the at least one electrical component is present in the first switching state of the second switching device and is interrupted in the second switching state of the second switching device, it is possible, in particular, to bring about a reversible disconnection of the at least one electrical component in the motor vehicle. In this way, any wear of the first switching device and/or of the second switching device is significantly reduced in comparison to the prior art. In particular, it is possible in an advantageous way to disconnect the electrical connection of the first energy supply unit to the at least one electrical component, wherein, furthermore, at least a temporary operation of the motor vehicle by means of the second energy supply unit is possible.

In this way, it is possible to ensure continued operation of the motor vehicle, at least in relation to functions that are relevant to safety, even during an accident or an imminent accident. Accordingly, in comparison to the prior art, the safety device can be designed to be more sensitive, wherein, only in the case of a high criticality of the motor vehicle are the first energy supply unit and the second energy supply unit disconnected from the at least one electrical component. As a result, it is possible to dispense with an armoring of the electrical components at least in part. Any wear of the first and/or second switching device is reduced and preferably prevented, wherein the second energy supply unit buffers, in particular, current peaks when there is a change in the switching state of the first and/or second switching device.

A criticality of the motor vehicle reflects, in particular, the manifestation of an existing danger and/or the level of probability of an accident of the motor vehicle. The criticality corresponds, in particular, to a risk of damage to the motor vehicle and, in particular, to the occupants of the motor vehicle. A higher criticality corresponds, in particular, to a more critical existing danger or to a higher accident probability. In particular, an abrupt increase in power and/or an abrupt power uptake of the drive of the motor vehicle increase or increases the criticality. A lower criticality corresponds, in particular, to a less critical existing danger or to a lower accident probability of the motor vehicle. In particular, a temporarily reduced power and/or temporarily reduced power uptake of the drive reduces the criticality. In other words, the criticality is higher the greater the instantaneous power and/or the instantaneous power uptake, and vice versa.

A reversible disconnection of the at least one electrical component refers to, in particular, a multiple interruption and re-establishment of the electrical connection of the at least one electrical component to the first energy supply unit and/or to the second energy supply unit. Such a reversible disconnection can be created, in particular, through a low-wear, preferably wear-free operation of the first switching device and/or second switching device.

In the case of the at least one electrical component, what is involved is, in particular, the drive of the motor vehicle. Preferably, the motor vehicle has additional electrical components, in particular a power electronics unit. Beyond this, it is possible to provide additional electrical components, in particular devices that are relevant to safety. Preferably, the at least one electrical component can be supplied with energy by way of an onboard power supply system of the motor vehicle with the first and/or the second energy supply unit, in particular when the onboard power supply system is not deactivated through disconnection of the electrical connection thereof from the energy supply units.

Preferably, in the first switching state of the first switching device, there is present an electrical connection of the first energy supply unit to the at least one electrical component, whereas, in the second switching state of the first switching device, the electrical connection of the first energy supply unit to the at least one electrical component is interrupted. Preferably, in the first switching state of the second switching device, there is present an electrical connection of the second energy supply unit to the at least one electrical component, whereas, in the second switching state of the second switching device, the electrical connection of the second energy supply unit to the at least one electrical component is interrupted.

Preferably, the first switching device and/or the second switching device is/are designed as a contactor or as a transistor, in particular a metal oxide semiconductor field-effect transistor (MOSFET), or has/have a contactor or a transistor, in particular a metal oxide semiconductor field-effect transistor (MOSFET). Alternatively, the first switching device and/or the second switching device can be designed differently, wherein it is crucial that a function in accordance with the safety device according to the invention can be ensured.

Preferably, the first energy supply unit is designed as a rechargeable battery. A rechargeable battery is understood to mean, in particular, a rechargeable storage unit for electric energy on an electrochemical basis. The first energy supply unit is, in particular, a high-voltage rechargeable battery.

Preferably, the second energy supply unit, which is designed as a capacitor, is designed as a supercapacitor. A supercapacitor is understood to mean, in particular, an electrochemical capacitor. Preferably, the second energy supply unit is charged by means of the first energy supply unit during operation of the motor vehicle, wherein, in particular, an electrical connection of the first energy supply unit and the second energy supply unit to each other is present. Preferably, the first energy supply unit and/or the second energy supply unit is/are arranged at a crash-safe place in or on the motor vehicle.

The electric drive of the motor vehicle has, in particular, an electric motor or is designed as an electric motor.

An enhancement of the invention provides that the safety device has a third switching device, wherein, through a first switching state of the third switching device, a discharging of the second energy supply unit is effected and, through a second switching state of the third switching device, the discharging of the second energy supply unit is prevented.

Preferably, the third switching device is designed as a contactor or as a transistor, in particular, as a metal oxide semiconductor field-effect transistor (MOSFET), or has a contactor or transistor, in particular a metal oxide semiconductor field-effect transistor (MOSFET). Alternatively, it is preferably provided that the third switching device is designed differently, wherein it is crucial that a function in accordance with the safety device according to the invention is ensured.

Through the discharging of the second energy supply unit, it is possible, in particular, to ensure the safety of the occupants and/or those involved in the accident during an accident or imminent accident of the motor vehicle.

In an enhancement of the invention, it is provided that the safety device has a computing device, which is in communication connection with at least one sensor device of the motor vehicle or a power electronics unit of the motor vehicle, by means of which, in particular, a power of the drive can be controlled and/or regulated, and is preferably in communication connection with at least one such sensor device of the motor vehicle and one such power electronics unit of the motor vehicle. The at least one sensor device preferably has a camera and/or a radar and/or an acceleration sensor or is composed of a camera and/or a radar and/or an acceleration sensor. It is preferably provided that the at least one sensor device has additional sensors and/or is composed of additional sensors. Through the utilization of devices of the motor vehicle that are already present, in particular the utilization of a power electronics unit and/or at least one sensor device of the kind addressed, it is possible to lower the costs for the safety device.

In a preferred embodiment of the safety device, it is provided that the computing device is equipped to determine an operating state of the motor vehicle, depending on the sensor data supplied by the at least one sensor device or depending on the power data supplied by the power electronics unit, preferably depending on the sensor data supplied by the at least one sensor device and depending on the power data supplied by the power electronics unit. Preferably, the computing device is equipped here for actuating, depending on the operating state, the first switching device and/or the second switching device and/or the third switching device, respectively, to adopt the first switching state and/or the second switching state.

Preferably, the computing device is provided continuously with sensor data by the at least one sensor device, in particular during operation of the motor vehicle. Preferably, the computing device is provided continuously with power data by the power electronics unit, in particular during operation of the motor vehicle. More preferably, the power electronics unit and the computing device are in communication connection with each other, wherein the power electronics unit is provided continuously with data regarding the operating state by the computing device, in particular during operation of the motor vehicle. The power electronics unit is preferably equipped for changing and, in particular, for reducing and/or increasing the power and/or the power uptake of the drive depending on the operating state.

The sensor data comprise, in particular, data relating to an existing danger and/or relating to an accident probability for the motor vehicle. The power data comprise, in particular, data relating to an instantaneous power uptake of the drive or relating to a demanded power of the drive. In particular, the operating state of the motor vehicle is determined by means of the computing device, wherein preferably the criticality of the motor vehicle is determined. Preferably, the operating state is determined depending on the criticality. In particular, operating states of the motor vehicle that differ from one another correspond to manifestations of the criticality that differ from one another. Preferably, the operating state of the motor vehicle is determined continuously, and more preferably, in real time. There then results, in particular, a time-dependent operating state. Preferably, the operating state adopts discrete stages. Preferably, the operating state of the motor vehicle is re-determined as a function of a change and, in particular, a change over time, of the sensor data and/or of the power data. This means, in particular, that, depending on a time course of the criticality of the motor vehicle, in particular, the operating state of the motor vehicle is re-determined in the case of a change in the existing danger and/or accident probability, preferably in the case of a change in the instantaneous power uptake or instantaneous power of the drive.

An enhancement of the invention provides that, in a first operating state of the motor vehicle and in a second operating state of the motor vehicle, the first switching device is in the first switching state, the second switching device is in the first switching state, and the third switching device is in the second switching state. In this case, the second operating state of the motor vehicle is preferably different from the first operating state of the motor vehicle. Preferably, the criticality associated with the second operating state of the motor vehicle is higher than the criticality assigned to the first operating state of the motor vehicle.

In particular, the first operating state corresponds to an operating state of the motor vehicle in which no danger to the motor vehicle is detected. In this case, energy is preferably provided to the drive to the full extent, in particular by way of the first energy supply unit. The second operating state corresponds, in particular, to an operating state of the motor vehicle in which a potential danger in regard to the motor vehicle is detected, in particular by means of the at least one sensor device. Preferably, in the second operating state, the power uptake of the drive is throttled, in particular by means of the power electronics unit.

An enhancement of the invention provides that, in a third operating state of the motor vehicle, the first switching device is in the second switching state, the second switching device is in the first switching state, and the third switching device is in the second switching state. Preferably, a criticality of the motor vehicle associated with the third operating state is higher than the criticality of the motor vehicle associated with the second operating state.

The third operating state corresponds preferably to an operating state of the motor vehicle in which an accident probability is very high and, in particular, lies at around 70%. In the third operating state, the first energy supply unit is disconnected from the at least one electrical component, in particular from the drive, wherein, furthermore, an energy supply of the at least one electrical component is ensured by way of the second energy supply unit.

An enhancement of the invention provides that, in a fourth operating state of the motor vehicle and in a fifth operating state of the motor vehicle, the first switching device is in the second switching state, the second switching device is in the first switching state, and the third switching device is in the first switching state.

Associated with the fourth operating state is preferably a criticality of the motor vehicle that is higher than the criticality in the third operating state. Preferably, the fifth operating state is associated with a criticality of the motor vehicle that is higher than the criticality of the motor vehicle in the fourth operating state.

The fourth operating state corresponds, in particular, to an operating state of the motor vehicle in which an accident is unavoidable, wherein the accident, in particular a collision of the motor vehicle with another object, has not yet taken place. In the fourth operating state, the second energy supply unit, in particular, is discharged.

The fifth operating state corresponds preferably to an operating state of the motor vehicle in which the accident, in particular the collision, has just begun. In the fifth operating state, preferably the power electronics unit is discharged via the emptied second energy supply unit.

In accordance with an enhancement of the invention, it is provided that, in a sixth operating state of the motor vehicle, the first switching device is in the second switching state, the second switching device is in the second switching state, and the third switching device is in the second switching state. Preferably associated with the sixth operating state is a criticality of the motor vehicle that is higher than the criticality of the motor vehicle associated with the fifth operating state.

The sixth operating state corresponds preferably to an operating state of the motor vehicle in which the accident, in particular the collision, has already begun and preferably is still in progress. Preferably, a deformation of the motor vehicle has not yet ended. In the sixth operating state, the first energy supply unit and/or the second energy supply unit is/are disconnected from the at least one electrical component, in particular from the drive and/or from the power electronics unit.

It is preferably provided that, particularly regardless of any change of the criticality, in particular a change over time, preferably a change in the sensor data and/or the power data, a shift of operating states from one stage to a next stage can occur. The stages of the operating states are preferably adopted in successive order, wherein, for example, after the first operating state, the second operating state and then the third operating state, etc., are adopted. Additionally, it is preferably provided that, depending on a change in criticality, particularly a change in time, individual stages are virtually skipped; for example, a shift occurs from the first operating state directly to the third operating state.

In an analogous way, it is preferably provided that, when there is a declining criticality, the operating state evolves in the direction of virtually lower stages, which correspond to a lower criticality of the motor vehicle. For example, a shift can occur from the third operating state to the second operating state and, finally, to the first operating state. In particular, when there is an especially fast change of the criticality, individual stages of the operating state can also be skipped, wherein, for example, a shift from the third operating state directly to the first operating state takes place.

The object is also achieved, in particular, in that a motor vehicle having a first energy supply unit, a second energy supply unit, which is connected in parallel to the first energy supply unit and is designed as a capacitor, at least one electrical component, in particular an electric drive, and preferably at least one sensor device, and/or a power electronics unit is created, which has a safety device. More preferably, the motor vehicle has a safety device according to the invention in accordance with one of the embodiments described above. In conjunction with the motor vehicle, there ensue, in particular, the advantages that were already explained in conjunction with the safety device.

The object is also achieved, in particular, in that a method for operating a safety device is created, wherein the safety device has a first switching device, wherein an electrical connection of a first energy supply unit of a motor vehicle to at least one electrical component of the motor vehicle, in particular to an electric drive of the motor vehicle, is made in a first switching state of the first switching device and is interrupted in a second switching state of the first switching device. It is provided that the safety device has a second switching device, wherein an electrical connection of a second energy supply unit of the motor vehicle, which is connected in parallel to the first energy supply unit and is designed as a capacitor, is made to the at least one electrical component in a first switching state of the second switching device and is interrupted in a second switching state of the second switching device. More preferably, in the scope of the method, a safety device according to the invention is operated in accordance with one of the embodiments described above. In the scope of the method, in particular, the advantages result that were already explained in conjunction with the safety device according to the invention.

BRIEF DESCRIPTION

The invention will be explained in detail below on the basis of the drawing.

FIG. 1. a schematic illustration of a motor vehicle with a safety device.

DETAILED DESCRIPTION

The sole FIGURE shows schematically a motor vehicle 1 with a first energy supply unit 3 and a second energy supply unit 5. The first energy supply unit 3 is preferably designed as a rechargeable battery. The second energy supply unit 5 is connected in parallel to the first energy supply unit 3 and is designed as a capacitor. More preferably, the second energy supply unit 5 is designed as a supercapacitor. Furthermore, the motor vehicle 1 has at least one electrical component, in particular an electric drive 7. The drive 7 is preferably designed as an electric motor.

In the exemplary embodiment in accordance with the FIG. 1, the motor vehicle 1 has at least one sensor device 9—here, two said devices—wherein, in this case, by way of example, a sensor device 9', which is designed as a camera, and a sensor device 9", which is designed as an acceleration sensor, are provided. Optionally, it is possible to provide additional sensor devices, this being illustrated in the FIGURE by the dots furnished with reference number 9'''.

Beyond this, the motor vehicle 1 has another electrical component, namely a power electronics unit 11, by means of which, in particular, a power of the drive 7 can be controlled and/or regulated.

The motor vehicle 1 has a safety device 13 for reversible disconnection of the at least one electrical component of the motor vehicle 1, in particular of the drive 7 and of the power electronics unit 11. The safety device 13 has a first switching device 15, wherein an electrical connection of the first energy supply unit 3 of the motor vehicle 1 to the at least one electrical component of the motor vehicle 1, in particular to the electric drive 7 and to the power electronics unit 11, is present in a first switching state of the first switching device 15 and is interrupted in a second switching state of the first switching device 15. The electrical connection is schematically illustrated by means of an electrical conductor identified by the reference sign 16.

It is provided that the safety device 13 has a second switching device 17, wherein an electrical connection of the second energy supply unit 5 of the motor vehicle 1 to the at least one electrical component is present in a first switching state of the second switching device 17 and is interrupted in a second switching state of the second switching device 17.

Here, the safety device 13 has a third switching device 19, wherein, through a first switching state of the third switching device 19, a discharging of the second energy supply unit 5 is effected and, through a second switching state of the third switching device 19, the discharging of the second energy supply unit 5 is prevented. In the exemplary embodiment illustrated in the FIGURE, a resistor 21 is provided in an electrical bypass path, which, in the first switching state of the third switching device 19, short-circuits the second energy supply unit 5.

The first switching device 15 is designed here as a switch that is closed in the first switching state of the first switching device 15 and is open in the second switching state of the first switching device 15. The second switching device 17 is designed here as a switch that is closed in the first switching state of the second switching device 17 and is open in the second switching state of the second switching device 17. The third switching device 19 is designed here as a switch that is closed in the first switching state of the third switching device 19 and is open in the second switching state of the third switching device 19.

Here, the safety device 13 has a computing device 23, which is in communication connection with the at least one sensor device 9 of the motor vehicle 1. A communication connection between the at least one sensor device 9 and the computing device 23 is schematically illustrated here by the arrow 25. Furthermore, the computing device 23 is in communication connection here with the power electronics unit 11 of the motor vehicle 1, by means of which, in particular, the power of the drive 7 can be controlled and/or regulated. The communication connection between the computing device 23 and the power electronics unit 11 is illustrated here schematically by a double arrow 27.

The computing device 23 is preferably equipped for determining an operating state of the motor vehicle 1, depending on the sensor data supplied to the at least one sensor device 9 and/or depending on the power data supplied to the power electronics unit 11. Preferably, the computing device 23 is equipped for actuating, depending on the operating states, the first switching device 15 and/or the second switching device 17 and/or the third switching device 19, respectively, to adopt the first switching states and/or the second switching state. An actuation of the first switching device 15 and/or of the second switching device 17 and/or of the third switching device 19 is illustrated schematically in the FIGURE by means of a dashed line 29.

It is also preferably provided that the at least one sensor device 9 of the computing device 23 provides sensor data, in particular data relating to an existing danger and/or to an accident probability of the motor vehicle 1. Furthermore, it is preferably provided that the power electronics unit 11 of the computing device 23 provides power data, in particular data relating to an instantaneous power uptake of the drive 7 and/or to a demanded power and/or instantaneous power of the drive 7.

Furthermore, it is preferably provided that the computing device 23 of the power electronics unit 11 provides data relating to the operating state of the motor vehicle 1. Depending on the data relating to the operating state of the motor vehicle 1, preferably the power of the drive 7 can be changed and preferably reduced by means of the power electronics unit 11.

Preferably, the motor vehicle 1 adopts different, in particular discrete stages of the operating states, each of which is associated, in particular, with a specific criticality of the motor vehicle 1. In an especially preferred exemplary embodiment, which will be discussed below in detail, six stages of the operating states of the motor vehicle 1 are provided. A first operating state of the motor vehicle 1 is hereby associated, in particular, with the lowest criticality of the motor vehicle 1, whereas a sixth operating state is associated with the highest criticality of the motor vehicle 1. Provided between the first operating state and the sixth operating state are the second operating state, the third operating state, the fourth operating state, and the fifth operating state, each with increasing associated criticality.

It is preferably provided here that, depending on the sensor data, which, in particular, describe an existing danger and/or accident probability of the motor vehicle 1, and/or on the power data, in particular an instantaneous power uptake and/or a demanded power of the drive 7, the operating state is determined. In particular, this determination occurs continuously, preferably in real time. Thus, one of the six operating states is determined preferably continuously in its time course, in particular during operation of the motor vehicle 1.

In the following, the preferably provided six operating states are explained in detail.

Preferably, in the first operating state of the motor vehicle 1 and in the second operating state of the motor vehicle 1, the first switching device 15 is in the first switching state, the second switching device 17 is in the first switching state, and the third switching device 19 is in the second switching state. The first operating state corresponds preferably to an operating state of the motor vehicle 1 in which no danger exists.

In the first operating state, preferably a maximum energy is supplied to the drive 7, in particular by way of the first energy supply unit 3. The second operating state, in which the first switching device 15, the second switching device 17, and the third switching device 19 are unchanged in comparison to the first operating state in regard to their switching states, corresponds to an operating state of the motor vehicle 1 in which, in particular, a danger potential is detected. Such a detection is realized, in particular, by means of the at least one sensor device 9. In the second operating state, the supply of energy, in particular from the first energy supply unit 3 to the drive 7, is preferably reduced by means of the power electronics unit 11.

Preferably, in the third operating state of the motor vehicle 1, the first switching device 15 is in the second switching state, the second switching device 17 is in the first switching state, and the third switching device 19 is in the second switching state. The third operating state corresponds preferably to an operating state of the motor vehicle 1 in which an accident probability is very high, in particular around 70%. In the third operating state, the first energy supply unit 3 is disconnected from the at least one electrical component, in particular from the drive 7 and from the power electronics unit 11. By means of the second energy supply unit 5, however, in addition, an energy supply of the electrical components, in particular of the drive 7, is ensured.

Preferably, in the fourth operating state of the motor vehicle 1 and in the fifth operating state of the motor vehicle 1, the first switching device 15 is in the second switching state, the second switching device 17 is in the first switching state, and the third switching device 19 is in the first switching state. The fourth operating state corresponds, in particular, to an operating state of the motor vehicle 1 in which an accident, in particular a collision, is unavoidable. Such an accident is preferably imminent in the fourth operating state. In the fourth operating state, the second energy supply unit 5, in particular, is discharged.

The fifth operating state corresponds, in particular, to an operating state of the motor vehicle 1 for which the accident has just begun. In the fifth operating state, the power electronics unit 11, in particular, is discharged via the emptied second energy supply unit 5, that is, the capacitor, preferably the supercapacitor.

Preferably, in the sixth operating state of the motor vehicle 1, the first switching device 15 is in the second switching state, the second switching device 17 is in the second switching state, and the third switching device 19 is in the second switching state. Preferably, the sixth operating state corresponds to an operating state of the motor vehicle 1 in which the accident, in particular, a collision, is in progress. Therefore, the accident has already taken place, wherein, in particular, damage, particularly a destruction and/or a deformation, of the motor vehicle 1 has not yet ended. In the sixth operating state, the second energy supply unit 5 is also disconnected from the at least one electrical component, in particular from the drive 7 and from the power electronics unit 11. An onboard power supply system of the motor vehicle 1 is preferably virtually deactivated in the sixth operating state.

In the following, a method is described by means of which the safety device 13 in accordance with the exemplary embodiment illustrated in the FIG. 1 is operated. In this case, the safety device 13 has the first switching device 15, wherein the electrical connection of the first energy supply unit 3 of the motor vehicle 1 to the at least one electrical component of the motor vehicle 1, in particular to the electric drive 7 of the motor vehicle 1 and preferably to the power electronics unit 11 of the motor vehicle 1, is made in the first switching state of the first switching device 15 and is interrupted in the second switching state of the first switching device 15.

It is provided that the safety device 13 has the second switching device 17, wherein the electrical connection of the second energy supply unit 5 of the motor vehicle 1, which is connected in parallel to the first energy supply unit 3 and is designed as a capacitor, in particular a supercapacitor, to the at least one electrical component is made in the first switching state of the second switching device 17 and is interrupted in the second switching state of the second switching device 17.

It is shown overall that, by means of the safety device 13, the motor vehicle 1 with the safety device 13, and the method for operating the safety device 13, a reversible disconnection of the at least one electrical component in the motor vehicle is realized. In this way, a protection of occupants of the motor vehicle 1 is ensured, wherein, at the same time, any impairment in the operation of the motor vehicle 1 as well as any wear of the switching devices 15, 17, 19 are reduced.

The invention claimed is:

1. A safety device for the reversible disconnection of at least one electrical component of a motor vehicle, comprising:
a first switching device, wherein an electrical connection of a first energy supply unit of the motor vehicle to the at least one electrical component, in particular to an electric drive of the motor vehicle, is present in a first switching state of the first switching device and is interrupted in a second switching state of the first switching device,
wherein the safety device has a second switching device, wherein an electrical connection of a second energy supply unit of the motor vehicle, which is connected in parallel to the first energy supply unit and is designed as a capacitor, to the at least one electrical component is present in a first switching state of the second switching device and is interrupted in a second switching state of the second switching device, and
a computing device, which is in communication connection with at least one sensor device of the motor vehicle and/or with a power electronics unit of the motor vehicle, by which, in particular, a power of the drive can be controlled and/or regulated wherein the computing device is equipped for determining an operating state of the motor vehicle, depending on the sensor data supplied by the at least one sensor device and/or depending on the power data supplied by the power electronics unit, and for actuating, depending on the operating state, the first switching device and/or the second switching device and/or the third switching device, respectively, to adopt the first switching state and/or the second switching state.

2. The safety device according to claim 1, further comprising:
a third switching device, wherein, by way of a first switching state of the third switching device, a discharging of the second energy supply unit is effected and, by way of a second switching state of the third switching device, the discharging of the second energy supply unit is prevented.

3. The safety device according to claim 1, wherein, in a first operating state of the motor vehicle and in a second operating state of the motor vehicle, the first switching device is in the first switching state, the second switching device is in the first switching state, and the third switching device is in the second switching state.

4. The safety device according to claim 1, wherein, in a third operating state of the motor vehicle, the first switching device is in the second switching state, the second switching device is in the first switching state, and the third switching device is in the second switching state.

5. The safety device according to claim 4, wherein, in a fourth operating state of the motor vehicle and in a fifth operating state of the motor vehicle, the first switching device is in the second switching state, the second switching device is in the first switching state, and the third switching device is in the first switching state.

6. The safety device according to claim 5, wherein, in a sixth operating state of the motor vehicle, the first switching device is in the second switching state, the second switching device is in the second switching state, and the third switching device is in the second switching state.

7. A method for operating a safety device, wherein the safety device has a first switching device, wherein an electrical connection of a first energy supply unit of a motor vehicle to at least one electrical component of the motor vehicle, in particular to an electric drive of the motor vehicle, is made in a first switching state of the first switching device and is interrupted in a second switching state of the first switching device, wherein the safety device has a second switching device, wherein an electrical connection of a second energy supply unit of the motor vehicle, which is connected in parallel to the first energy supply unit and is designed as a capacitor, to the at least one electrical component is made in a first switching state of the second switching device and is interrupted in a second switching state of the second switching device, and a computing device, which is in communication connection with at least one sensor device of the motor vehicle and/or with a power electronics unit of the motor vehicle, by which, in particular, a power of the drive can be controlled and/or regulated wherein the computing device is equipped for determining an operating state of the motor vehicle, depending on the sensor data supplied by the at least one sensor device and/or depending on the power data supplied by the power electronics unit, and for actuating, depending on the operating state, the first switching device and/or the second switching device and/or the third switching device, respectively, to adopt the first switching state and/or the second switching state.

* * * * *